July 10, 1928.

O. SCHAFFLER 1,676,669

ELECTRIC COOKING AND HEATING DEVICE

Filed Aug. 3, 1927    3 Sheets-Sheet 1

INVENTOR.
Oscar Schaffler
BY Myron J. Dikeman
ATTORNEY.

July 10, 1928.

O. SCHAFFLER 1,676,669

ELECTRIC COOKING AND HEATING DEVICE

Filed Aug. 3, 1927    3 Sheets-Sheet 2

INVENTOR.
Oscar Schaffler
BY
ATTORNEY.

July 10, 1928.  
O. SCHAFFLER  
1,676,669  
ELECTRIC COOKING AND HEATING DEVICE  
Filed Aug. 3, 1927     3 Sheets-Sheet 3

INVENTOR.  
Oscar Schaffler  
BY Myron J Dikeman  
ATTORNEY.

Patented July 10, 1928.

1,676,669

UNITED STATES PATENT OFFICE.

OSCAR SCHAFFLER, OF DETROIT, MICHIGAN.

ELECTRIC COOKING AND HEATING DEVICE.

Application filed August 3, 1927. Serial No. 210,257.

The object of my invention is to produce a heating device which is adapted for general household purposes, and may be used for both cooking and for heating as might be required for light housekeeping.

Another object is to produce a heating device that is convertible from a general heating stove to a cooking device by the use of small attachments applicable thereto, changing same into an open grate of a closed oven.

Another object is to produce a heating device that operates by a detachable heating unit which may be easily removed and replaced by a new section without the necessity of technical or experienced assistance.

A further object is to produce a convertible heating and cooking device that is adapted to use in either large or small sizes, that is simple in its construction, easily and efficiently operated and can be manufactured at a very low cost.

These several objects are attained in the preferred form by the construction and arrangement of parts more fully hereinafter shown.

Similar parts on all drawings are marked by similar numerals.

Figure 2:
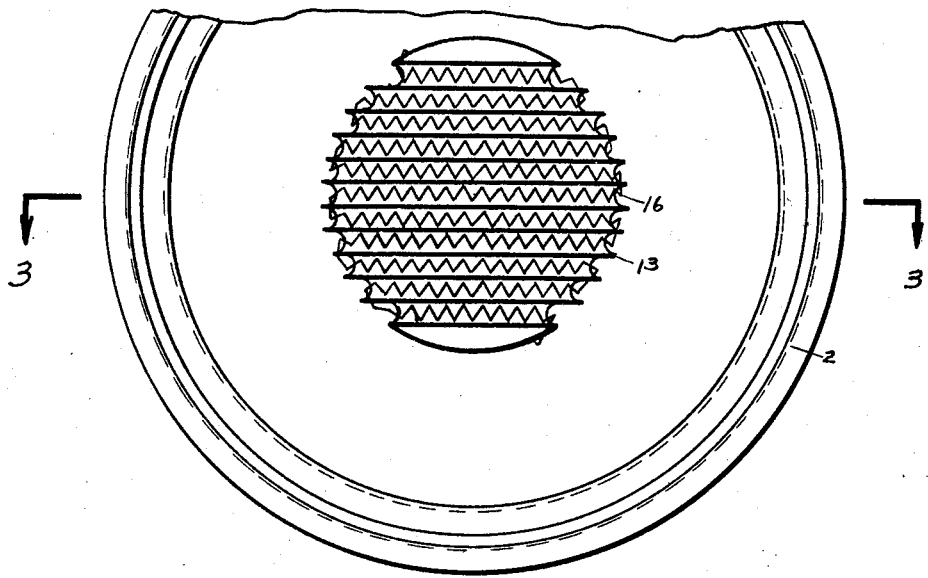
Fig. 2 is a top view of the heater, with the cover removed showing the general arrangement of the heating unit as mounted therein.
Figure 1:
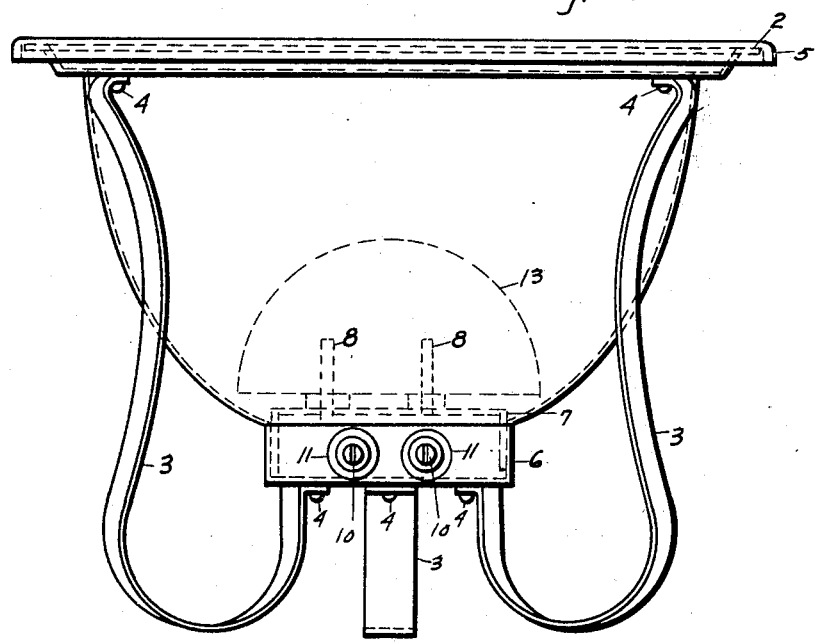
Fig. 1 is a side view of my device showing the general exterior arrangement.
Figure 3:
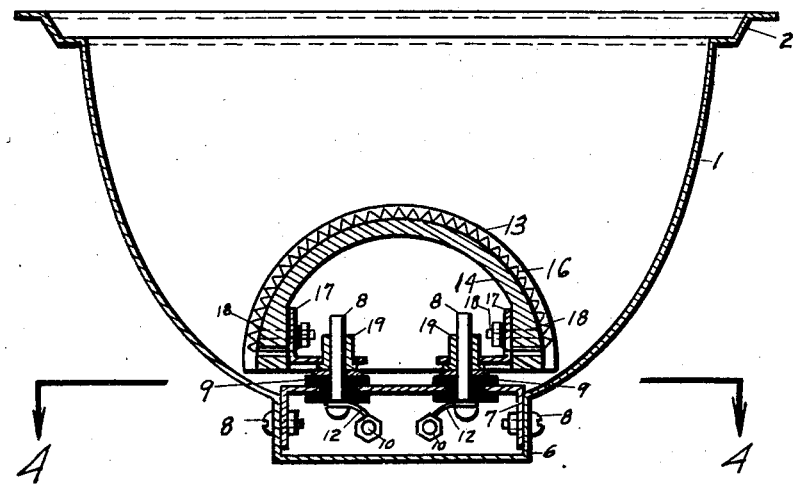
Fig. 3, is a sectional view taken on the line —3—3— of the Fig. 2, showing the connection of the heating unit as mounted on the slip terminals.
Figure 4:
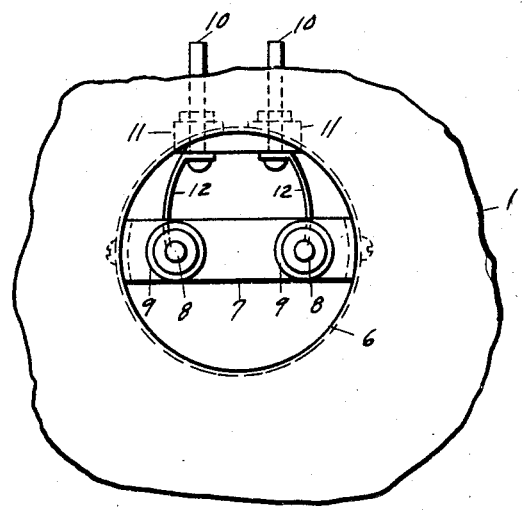
Fig. 4, is a sectional view taken on the line —4—4— of the Fig. 3, with the heating unit removed, showing the slip terminals and the connections therefor leading into an electric circuit.
Figure 5:
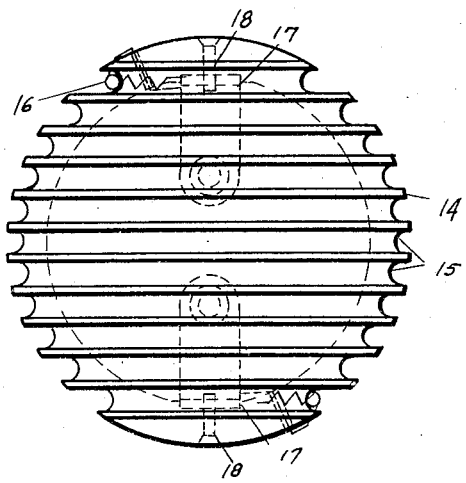
Fig. 5, is the top view of a special matrix upon which the heating filament wires are to be wound, and shows the detachable means as applied thereto.
Figure 6:
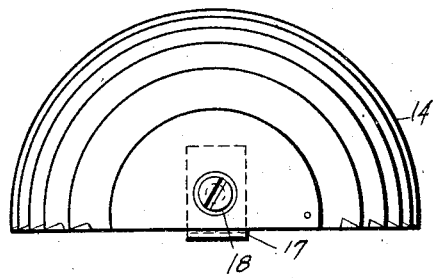
Fig. 6 is a side view of the matrix shown in the Fig. 5 showing the spherical structure of the burner.

I will now describe more fully the detailed structure of my device, referring to the drawings and the marks thereon.

In general, my device comprises a semi-spherical casing mounted on suitable leg supports for holding the casing in a horizontal position with the open side on top. Within the bottom of the casing is mounted a detachable heating coil, fully insulated from the casing and connected into an electric circuit. The casing is designed to receive thereon a cover plate, for converting same into a cooking stove, by the use of special grates the heat may be directed upon a baking oven mounted thereon in the place of the cover plate.

The casing —1— is made of sheet metal, preferably of aluminum because of its special heat conductivity, and is shaped into a semi-spherical bowl. The top edge of the casing is formed with a recessed rim —2—, formed to receive special grate members within the recess, or to receive a cover plate thereon. The casing —1— is provided with suitable supporting legs —3— fixedly attached to the casing walls, and in a manner to hold the casing —1— in a horizontal position with the open side at the top. The style or type of legs are not material to the structure operation of the device, and applicant has chosen to illustrate a simple U-shaped metal leg attached to the casing by small rivets —4—, which are suitable for the devices in the smaller sizes. Over the top edge rim —2— is fitted a rimmed cover plate —5—, and illustrates one means of converting the device into a cooking utensil. While the cover —2— is shown as a solid plate, it may also be made with an open center, provided with a screen section mounted therein for allowing direct contact of the burner heat with any cooking utensil placed therein, or a special oven may be formed and fitted thereto, for converting the device into a baking device. The bottom of the casing —1— is formed with a cup shaped recess —6— therein, depressed below the semi-spherical walls, and carries mounted therein a rigged terminal support bar —7—. The terminal bar —7— is fixedly attached there to by the small bolts —8— and holds the support bar across the center of the opening in the recess —6—. Fixedly mounted in the terminal bar —7— are two electric terminal plugs —8—, positioned therein in a vertical position and parallel with the axis of the casing —1—, and concentric therewith. The terminal plugs —8— are completely insulated from the bar —7— and the casing —1— by the insulators —9— fixedly mounted within the bar. Within the side walls of the cup recess —6— of the casing, are mounted two electric terminal plugs —10—, each fixedly attached thereto, and each plug completely insulated therefrom by the special insulators —11— mounted within the casing walls. The terminal plugs —10— are connected to the terminal plugs —8— by the metal electric wires —12—, placing all of the plugs within the same circuit. The terminal plugs —10— are spaced and positioned to receive thereon any standard terminal socket as now commonly used for making electrical connections with devices of this type, and commonly known as a slip socket. Slidably mounted on the terminals —8— is a detachable electric heating unit —13—. The unit —13— comprises a matrix —14— made of porcelain or any suitable insulating material, and is also semispherical in design, and shaped with a series of circular grooves —15— positioned across the curved surface thereof, the grooves —15— being positioned parallel with each other and terminate at the edges of the matrix —14—. The grooves —15— being of a size to receive a small coil —16— of filament wire therein. The filament wire —16— is made of metal having a high electrical resistance, usually iron wire, and is coiled and inserted within the grooves, interweaving back and forth consecutively through the adjacent grooves, filling all of the grooves by one continuous filament wire. Beneath the matrix —14— is mounted two terminal sockets —17—, fixedly attached to the matrix walls by the small bolts —18—, and the ends of the filament wire —16— are connected therewith, one filament end attached to each terminal socket. The terminal sockets —17— are provided with recess members —19—, fixedly attached thereto, and positioned therein to engage and fit the terminal posts —8— as are mounted in the bottom of the casing —1—, each socket making an electric connection with its respective terminal plug, and completing an electric circuit from the terminal plugs —10— through the detachable heating unit —13—. By the construction of my device, the terminals are all mounted within the casing walls, but completely insulated therefrom, while the heating coil is a separate, detachable unit in itself, and may easily be removed therefrom by sliding the sockets from the terminal plugs —8—. All connections of the heating wires being mounted within the matrix, provide for easy removal of the unit without disturbing any of the electrical connections. The heating unit —13— being the only part subject to disintegration or destruction, may be easily removed and replaced by an entire new unit by simply sliding the old unit off the terminal plugs —8— and inserting the new unit thereon. While my device is especially adapted for cooking purposes, it may easily be converted into a heater by removing the cover plate —2— from the top, and then tilting the whole frame and casing on one edge, the same being then supported on the rim —2— and two of the leg members, the rim and legs preventing the heated casing walls from coming in contact with the supporting floor walls.

Having fully described my heating device, what I claim as my invention and desire to secure by Letters Patent is:

1. A convertible heating device adapted for use as both a heater and cooker, comprising a semi-spherical metal casing having suitable supporting legs attached thereto for holding said casing in a horizontal position, two sets of electrical terminal plugs mounted within the bottom walls of said casing and completely insulated therefrom, an electric heating unit slidably mounted on one set of the terminal plugs for completing an electric circuit through all of the terminal plugs, and means for connecting said terminal plugs and heating unit within an electric circuit.

2. A convertible heating device adapted for use as a heater of a cooker, comprising a semi-spherical metal casing having suitable leg supports attached thereto for holding said casing in a horizontal position with the open side of the casing at the top, two electric terminal plugs mounted in the bottom of the semi-spherical casing, also in a vertical position, two electric terminal plugs mounted in the side walls of the semi-spherical casing, the two sets of terminal plugs being connected together by terminal wires, means for connecting the side terminal plugs within an electric circuit, a detachable heating unit slidably mounted in the inner vertical terminal plugs, said heating unit being provided with filament heating wires mounted thereon and connected directly with the mountings for the vertical terminal plugs, completing an electric circuit therewith.

3. A heating unit comprising a semispherical matrix having a series of circular grooves formed over the curved surface thereof, said grooves being positioned parallel with each other, two support brackets mounted within said matrix and fixedly attached thereto, a plug socket mounted within each of the support brackets, said sockets being capable of receiving a slip terminal plug therein, a coil filament wire of high electrical resistance mounted within the matrix grooves and interlaced therein through the consecutive grooves until all of the said grooves are filled by a single continuous filament wire, and said filament wire having its ends attached to and connected with the metal support brackets, one end with each bracket in a manner for completing an electric circuit when the unit is mounted upon electrical terminal plugs.

In witness whereof I sign these specifications.

OSCAR SCHAFFLER.